US009350744B2

(12) United States Patent
Chen et al.

(10) Patent No.: US 9,350,744 B2
(45) Date of Patent: *May 24, 2016

(54) APPLYING FORWARDING POLICY TO AN APPLICATION SESSION

(71) Applicant: A10 Networks, Inc., San Jose, CA (US)

(72) Inventors: Lee Chen, Saratoga, CA (US); John Chiong, San Jose, CA (US); Dennis Oshiba, Fremont, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,338

(22) Filed: Dec. 17, 2015

(65) Prior Publication Data

US 2016/0105446 A1    Apr. 14, 2016

Related U.S. Application Data

(63) Continuation of application No. 13/943,642, filed on Jul. 16, 2013, now Pat. No. 9,219,751, which is a continuation of application No. 13/650,179, filed on Oct. 12, 2012, now Pat. No. 8,595,791, which is a continuation of application No. 12/788,339, filed on May 27, 2010, now Pat. No. 8,312,507, which is a continuation-in-part of application No. 12/771,491, filed on Apr. 30, 2010, now Pat. No. 7,979,585, which is a continuation of application No. 11/582,613, filed on Oct. 17, 2006, now Pat. No. 7,716,378.

(51) Int. Cl.
*H04L 29/06* (2006.01)
*H04L 29/08* (2006.01)
*H04L 12/58* (2006.01)
(Continued)

(52) U.S. Cl.
CPC .......... *H04L 63/102* (2013.01); *H04L 63/0254* (2013.01); *H04L 63/105* (2013.01); *H04L 63/20* (2013.01); *G06F 21/00* (2013.01); *H04L 51/04* (2013.01); *H04L 63/02* (2013.01); *H04L 63/029* (2013.01); *H04L 63/0236* (2013.01); *H04L 63/0407* (2013.01); *H04L 65/1026* (2013.01); *H04L 67/10* (2013.01); *H04L 67/22* (2013.01); *H04L 67/306* (2013.01); *H04L 67/42* (2013.01); *H04M 1/72547* (2013.01); *H04W 12/00* (2013.01)

(58) Field of Classification Search
CPC ....... H04L 63/20; H04L 67/22; H04L 67/306; H04L 51/04; H04L 67/10; H04L 63/02; H04L 65/1026; H04L 63/0407; H04L 67/42; H04W 12/00; H04M 1/72547; G06F 21/00
See application file for complete search history.

(56) References Cited

U.S. PATENT DOCUMENTS 8,191,106 B2 *  5/2012  Choyi ................... H04L 63/20
                                              713/150
2005/0009520 A1 *  1/2005  Herrero ............. H04L 29/12188
                                              455/435.1

(Continued)

*Primary Examiner* — Carl Colin
*Assistant Examiner* — Gary Lavelle
(74) *Attorney, Agent, or Firm* — Carr & Ferrell LLP

(57) ABSTRACT

A method for applying a security policy to an application session, includes recognizing the application session between a network and an application via a security gateway; determining by the security gateway a user identity of the application session using information about the application session; obtaining by the security gateway the security policy comprising network parameters mapped to the user identity; and applying the security policy to the application session by the security gateway. The user identity may be a network user identity or an application user identity recognized from packets of the application session. The security policy may comprise a network traffic policy mapped and/or a document access policy mapped to the user identity, where the network traffic policy is applied to the application session. The security gateway may further generate a security report concerning the application of the security policy to the application session.

22 Claims, 11 Drawing Sheets

(51) Int. Cl.
*G06F 21/00* (2013.01)
*H04W 12/00* (2009.01)
*H04M 1/725* (2006.01)

(56) References Cited

U.S. PATENT DOCUMENTS

2006/0077926 A1* 4/2006 Rune ............... H04L 45/34 370/328
2006/0190997 A1* 8/2006 Mahajani ............ H04L 63/0227 726/10
2007/0156919 A1* 7/2007 Potti ..................... G06F 8/67 709/238
2007/0288247 A1* 12/2007 Mackay ................ G06Q 10/00 705/1.1
2007/0294209 A1* 12/2007 Strub .................... H04L 63/102
2008/0109870 A1* 5/2008 Sherlock ............. H04L 63/1425 726/1

* cited by examiner

Network Traffic Policy 451

Network based Application Session Access Control
Session Connection Rate Control
Traffic Shaping Control
Bandwidth Rate Capacity
Quality of Service or DSCP Marking Control
Packet Forwarding Control
Link Interface Preference
Server Load Balancing Preference
Application Session Modification Control

FIG. 8

APPLYING FORWARDING POLICY TO AN APPLICATION SESSION

CROSS-REFERENCE TO RELATED APPLICATIONS

The present application is a continuation of, and claims the priority benefit of, U.S. patent application Ser. No. 13/943,642 filed on Jul. 16, 2013 and titled "System and Method to Apply Forwarding Policy to an Application Session," now U.S. Pat. No. 9,219,751 issued on Dec. 22, 2015, which in turn is a continuation of U.S. patent application Ser. No. 13/650,179 filed on Oct. 12, 2012 and titled "System and Method to Apply Network Traffic Policy to an Application Session", now U.S. Pat. No. 8,595,791 issued on Nov. 26, 2013, which is in turn a continuation of U.S. patent application Ser. No. 12/788,339 filed on May 27, 2010 and titled "System and Method to Apply Network Traffic Policy to an Application Session", now U.S. Pat. No. 8,312,507 issued on Nov. 13, 2012, which in turn is a continuation-in-part of U.S. patent application Ser. No. 12/771,491 filed on Apr. 30, 2010 and titled "System and Method to Associate a Private User Identity with a Public User Identity", now U.S. Pat. No. 7,979,585 issued on Jul. 12, 2011, which in turn is a continuation of U.S. patent application Ser. No. 11/582,613 filed on Oct. 17, 2006 and titled "System and Method to Associate a Private User Identity with a Public User Identity", now U.S. Pat. No. 7,716,378 issued on May 11, 2010. All of the above disclosures are incorporated by reference herein in their entirety for all purposes.

BACKGROUND OF THE INVENTION

1. Field

This invention relates generally to data networking, and more specifically, to a system and method to apply a network traffic policy based on a user identity during an application session.

2. Related Art

The secure data network of a company is a critical component for day-to-day functioning of company business activities. Company employees access the secure data network for communication within the company and with the outside world. Company information, oftentimes proprietary or confidential, is exchanged during the communication.

Typically, an employee gains access to the company's secure data network by means of a network logon procedure using a private user identity, such as a user name "Robert P. Williamson" or an employee number "NG01-60410". Subsequent information exchange using the company's office applications, such as email, file transfer or document control is traceable based on the private user identity through network event logs.

Since the late 1990's, we have been witnessing the phenomenal rising popularity of public communication applications and services, such as email and Instant Messaging offered by Yahoo™, America Online™ (AOL), or Google™, conferencing and collaboration services offered by WebEx™ or Centra™, or peer-to-peer services for a variety of file sharing. Generally, a public communication service allows a user to exchange information through messaging, text chat or document exchange using a public user identity, such as "butterdragon", "fingernail1984", or "peterrabbit".

However, in a company setting, when an employee connects to a public communication service with a public user identity over the company's secure data network, the information exchange is not easily traceable if at all since the public user identity is not tied to the private user identity.

In one example, a company's information technology (IT) department notices that an employee Victor has been using the company's email system to send out proprietary documents, violating the company's security policy. After issuing a warning to Victor, the IT department finds no further violations. Unfortunately, they are not aware of the fact that Victor has continued this activity using Yahoo™ email with a public user identity "PiratesOfCaribbean@Yahoo.com".

In another example, two weeks before a major trade show, a company implements a security measure to monitor communication activities of employees of director level and above to ensure confidentiality of competitive information. This security measure, covering company email, phone conversation and voice messaging, nevertheless proves to be a failure as sensitive information leaks out to a business reporter anyway prior to the trade show. The source of the leak may never be confirmed, but the business reporter privately discloses that he gets the information from an anonymous employee of the company using AOL Instant Messaging™ with screen name "opensecret2006".

The above discussion illustrates the need for a security solution to associate a user identity to a public application.

BRIEF SUMMARY OF THE INVENTION

Method for applying a security policy to an application session, includes: recognizing the application session between a network and an application via a security gateway; determining by the security gateway a user identity of the application session using information about the application session; obtaining by the security gateway the security policy comprising network parameters mapped to the user identity; and applying the security policy to the application session by the security gateway. The user identity may be a network user identity or an application user identity recognized from packets of the application session. The security policy may comprise a network traffic policy mapped and/or a document access policy mapped to the user identity, where the network traffic policy is applied to the application session. The security gateway may further generate a security report concerning the application of the security policy to the application session. The security policy may be a forwarding policy.

BRIEF DESCRIPTION OF THE DRAWINGS

FIG. 8 illustrates a plurality of embodiments of network traffic policy.

DETAILED DESCRIPTION OF THE INVENTION

Figure 1A:
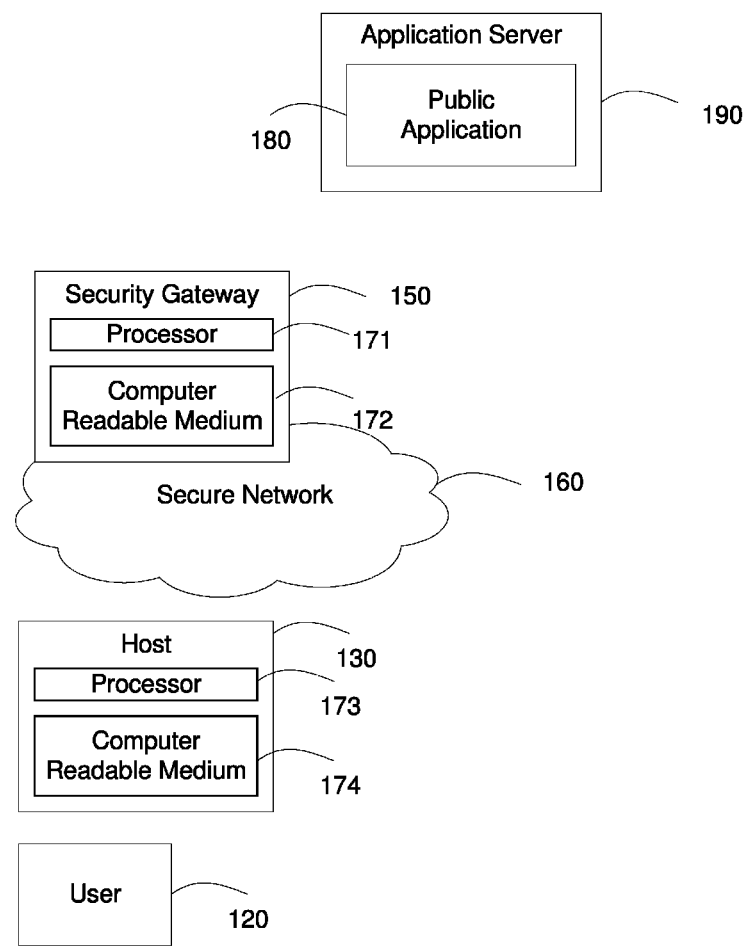
FIG. 1A illustrates a secure network.

FIG. 1A illustrates a secure network.

A secure network 160 includes a host 130. User 120 uses host 130 to access a public application 180 hosted in application server 190. Application server 190 is outside of secure network 160. The network traffic between host 130 and application server 190 passes through security gateway 150. The security gateway 150 is operationally coupled to a processor 171 and a computer readable medium 172. The computer readable medium 172 stores computer readable program code for implementing the various embodiments of the present invention as described herein.

Host 130 is a computing device with network access capabilities. The host 130 is operationally coupled to a processor 173 and a computer readable medium 174. The computer readable medium 174 stores computer readable program code for implementing the various embodiments of the present invention as described herein. In one embodiment, host 130 is a workstation, a desktop personal computer or a laptop personal computer. In one embodiment, host 130 is a Personal Data Assistant (PDA), a smartphone, or a cellular phone.

In one embodiment, secure network 160 is an Internet Protocol (IP) network. In one embodiment, secure network 160 is a corporate data network or a regional corporate data network. In one embodiment, secure network 160 is an Internet service provider network. In one embodiment, secure network 160 is a residential data network. In one embodiment, secure network 160 includes a wired network such as Ethernet. In one embodiment, secure network 160 includes a wireless network such as a WiFi network.

Public application 180 provides a service that allows user 120 to communicate with other users in a real-time fashion. In one embodiment, the service includes text chat. In one embodiment, the service includes a voice call or a video call. In one embodiment, the service includes a network game. In one embodiment, the service includes exchanging a document, such as sending or receiving a text document, a PowerPoint™ presentation, an Excel™ spreadsheet, an image file, a music file or a video clip. In one embodiment, the service includes a collaborative document processing such as creating a document, a business plan, an agreement, wherein user 120 collaborates with other users in a real time fashion. In one embodiment, the service includes a collaborative information exchange such as a conference call. In one embodiment, the service is a social networking service. In one embodiment, the service includes real-time collaboration and non real-time collaboration.

In one example, public application 180 provides America Online Instant Messenger™ service. In one example, public application 180 provides Yahoo Instant Messenger™ voice service. In one embodiment, public application 180 provides a file sharing service such as Kazaa™ file sharing service. In one embodiment, public application 180 provides a network game service such as Microsoft™ Network Game service. In one embodiment, public application 180 provides an on-line collaborative document processing such as Google Docs™, and Salesforce.com™. In one embodiment, public application 180 provides an on-line information exchange and communications such as WebEx™. In one embodiment, public application 180 provides live information streaming such as live video streaming, live audio streaming, and instantaneous picture uploading.

Security gateway 150 is situated at the edge of secure network 160. Security gateway 150 connects secure network 160 to public application 180. Security gateway 150 receives network traffic from secure network 160 and transmits the network traffic to application server 190. Likewise, security gateway 150 receives network traffic from application server 190 and transmits the network traffic to secure network 160.

In one embodiment, security gateway 150 includes the function of a corporate Wide Area Network (WAN) gateway. In one embodiment, security gateway 150 includes the function of a residential broadband gateway. In one embodiment, security gateway 150 includes the function of a WAN gateway for an Internet service provider.

Figure 1B:
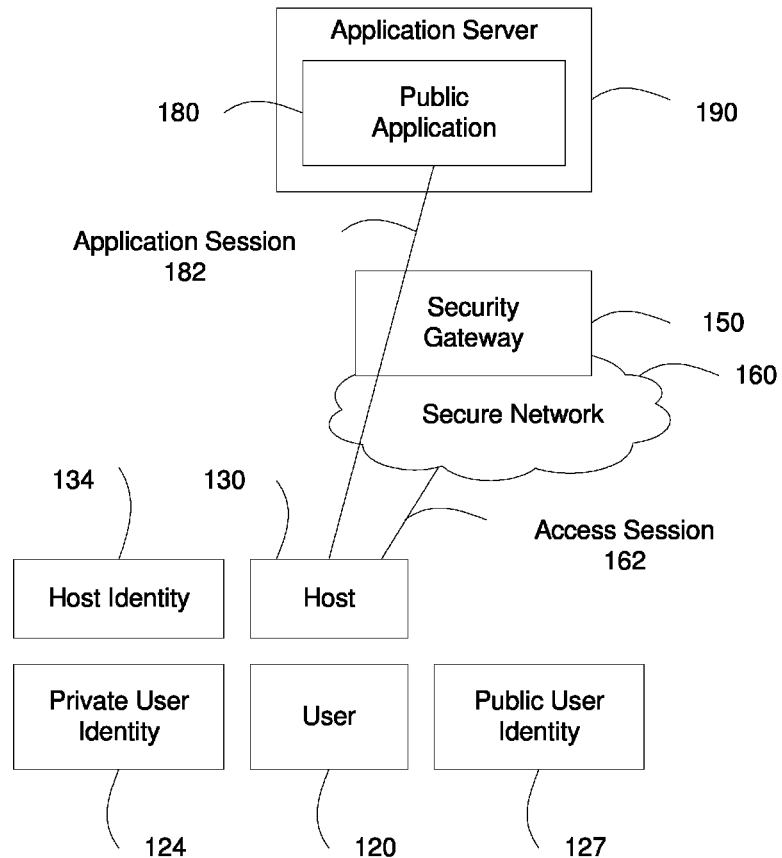
FIG. 1B illustrates an access session and an application session.

FIG. 1B illustrates an access session and an application session.

User 120 uses host 130 to access secure network 160 during an access session 162.

Host 130 has a host identity 134. Host 130 uses host identity 134 to connect to secure network 160. In one embodiment, host identity 134 includes an IP address. In one embodiment, host identity 134 includes a Media Access Control (MAC) address.

Within secure network 160, user 120 has a private user identity 124. In one embodiment, private user identity 124 is an employee number or an employee name. In one embodiment, private user identity 124 is an Internet service subscription identity. In one embodiment, access session 162 is established after a successful network user log-in procedure, such as an employee network log-in, for secure network 160 using private user identity 124. Private user identity 124 is associated with host identity 134. In one embodiment, host 130 is a guest computing device. Private user identity 124 is associated with an Ethernet switch port where host 130 connects. In this embodiment, private user identity 124 is a port number, an Ethernet interface identity, or an Ethernet VLAN identity.

User 120 uses host 130 to access public application 180 in an application session 182. User 120 uses a public user identity 127 during application session 182. In one embodiment, public application 180 prompts user 120 to log-in before establishing application session 182. During the application user log-in procedure, user 120 provides to public application 180 public user identity 127. In another embodiment, public application 180 selects a public user identity 127 for user 120 for application session 182. In one embodiment, public user identity 127 is set up through a user registration process or a service subscription process. Network traffic in application session 182 passes through security gateway 150.

Figure 1C:
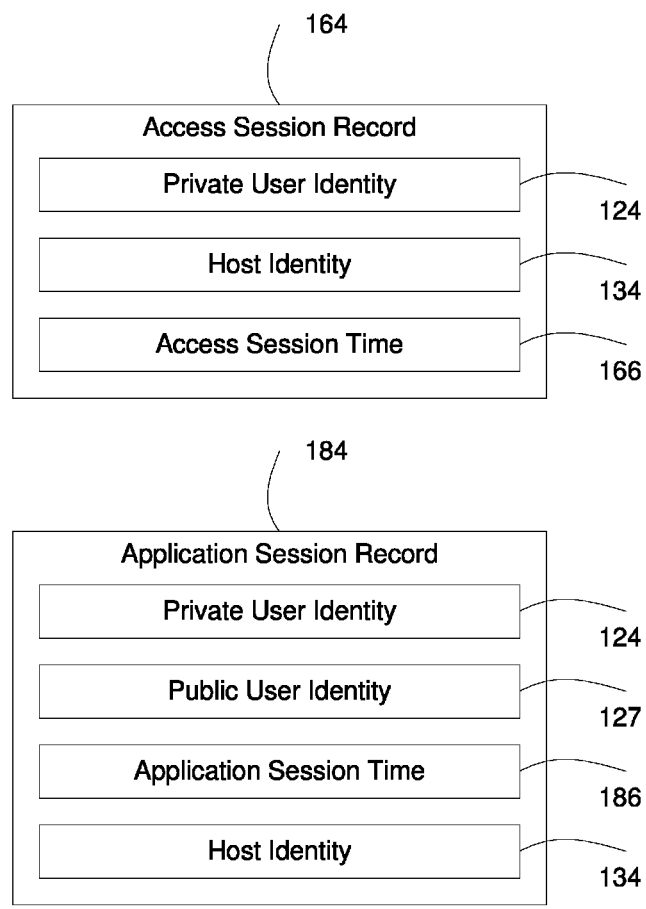
FIG. 1C illustrates an access session record and an application session record.

FIG. 1C illustrates an access session record and an application session record.

Access session record 164 records information about access session 162. The information includes private user identity 124, host identity 134 and access session time 166. In one embodiment, access session time 166 is the starting time when access session 162 is established. In one embodiment, access session time 166 includes the starting time and the ending time when user 120 finishes access session 162. In one embodiment, access session time 166 is a time stamp for a time during access session 162.

Application session record 184 records information about application session 182. The information includes private user identity 124, public user identity 127, and application session time 186. In one embodiment, the information further includes host identity 134. In one embodiment, application session time 186 includes the starting time when application session 182 is established. In one embodiment, application session time 186 includes a time stamp during application session 182. In one embodiment, application session time 186 includes a time stamp when security gateway 150 recognizes application session 182.

Figure 2:
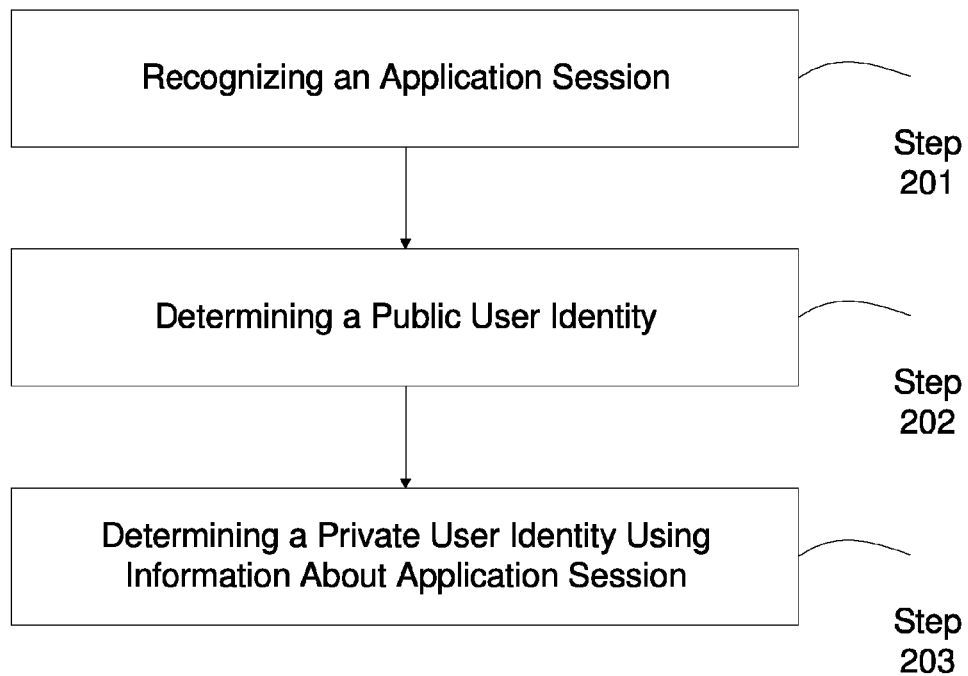
FIG. 2 illustrates a process to generate an application session record.

FIG. 2 illustrates a process to generate an application session record.

The process of generating application session record 184 includes multiple steps.

In step 201, security gateway 150 recognizes an application session.

In step 202, security gateway 150 determines a public user identity of the application session.

In step 203, security gateway 150 determines a private user identity using information about the application session.

Figure 3:
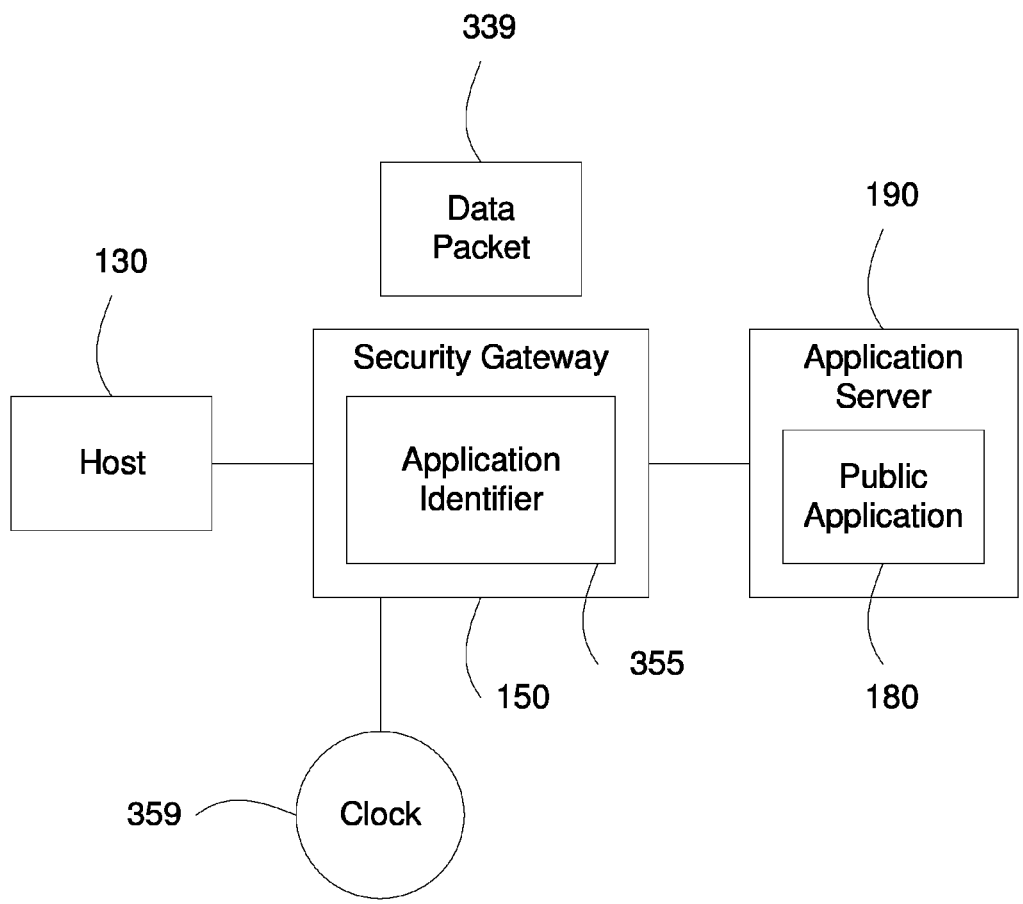
FIG. 3 illustrates a process to recognize an application session.
Figure 4A:
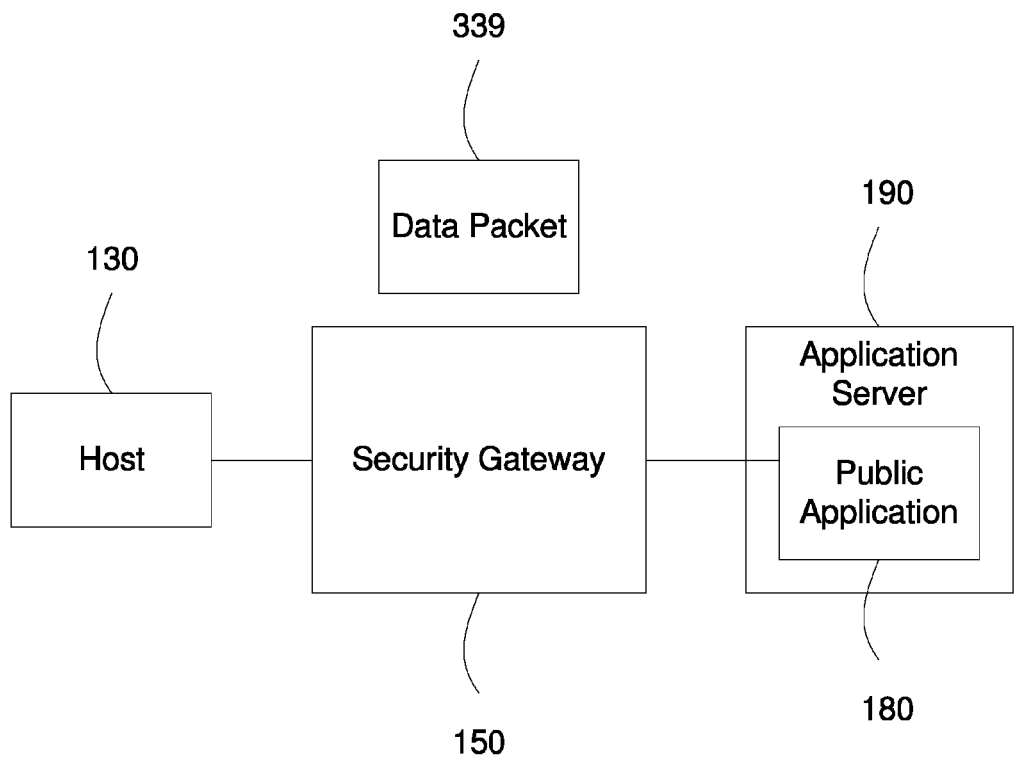
FIG. 4A illustrates a process to determine a public user identity of application session.
Figure 4B:
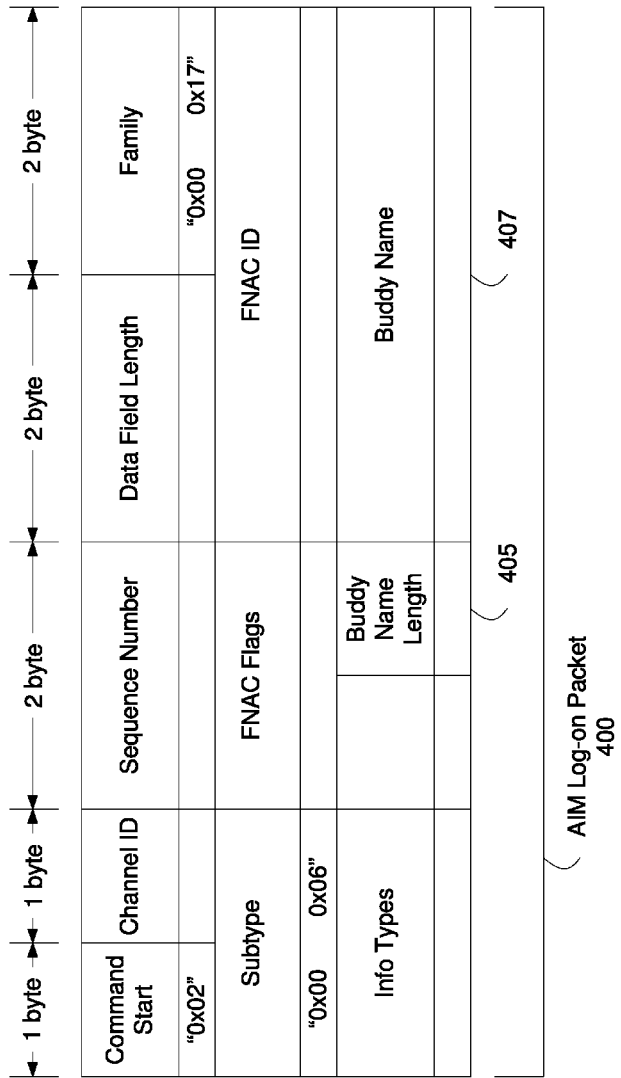
FIG. 4B illustrates a data packet in an AIM log-on packet.
Figure 5:
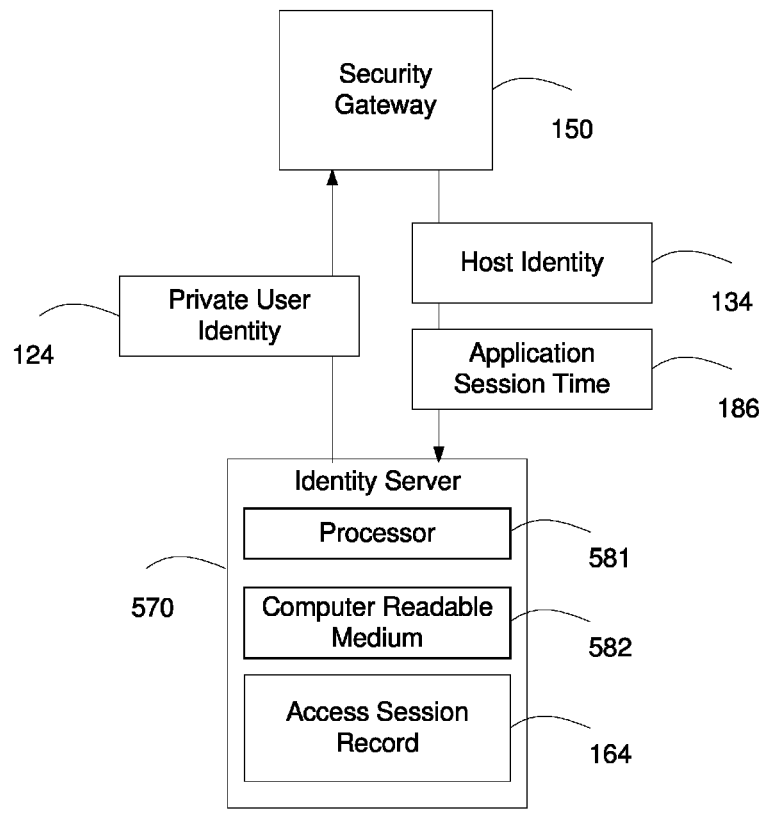
FIG. 5 illustrates a process to determine a private user identity.

FIGS. 3-5 illustrates steps 201-203 respectively.

FIG. 3 illustrates a process to recognize an application session.

Security gateway 150 inspects network traffic between host 130 and application server 190 to recognize application session 182 for public application 180.

In one embodiment, security gateway 150 inspects data packet 339 between host 130 and application server 190 for the recognition of application session 182.

Security gateway 150 includes an application identifier 355 for public application 180. Application identifier 355 includes information for recognizing application session 182. In one embodiment, application identifier 355 includes a transport layer information, such as Transmission Control Protocol (TCP) or User Diagram Protocol (UDP); and at least one transport port number, such as a TCP port number or a UDP port number. In one embodiment, application identifier 355 includes application layer information, such as one or more data filters wherein a data filter specifies a value and a position of the value in a data packet. In one example, a data filter is [byte 0 with value "0x52"]. In one example, a data filter is [byte 4-7 with ASCII value of "ADEH"].

Security gateway 150 matches data packet 339 against application identifier 355.

In one embodiment, application identifier 355 includes transport protocol type of TCP and a destination TCP port number of 5190, the TCP port number used by AIM protocol. In this embodiment, data packet 339 is a TCP packet from host 130 to application server 190. Security gateway 150 matches data packet 339 against application identifier 355 and determines that public application 180 provides AIM service.

Security gateway 150 creates application session record 184. Security gateway 150 extracted the source IP address from the IP header of data packet 339, and stores the source IP address as host identity 134. In one embodiment, data packet 339 includes link layer information, such as a source MAC address; security gateway 150 extracts and stores the source MAC address as host identity 134.

In one embodiment, security gateway 150 connects to a clock 359. Clock 359 indicates the current time of day. Security gateway 150 stores the time of day indicated by clock 359 in application session time 186.

FIG. 4A illustrates a process to determine a public user identity of application session 182.

The method for determining public user identity 127 is typically specific to public application 180. In one embodiment, data packet 339 is an application packet. For example, public application 180 provides AIM service; data packet 339 is an AIM packet.

An AIM packet includes multiple fields, for example
Command start field is a 1-byte data field starting at byte offset 0 having a fixed hexadecimal value "0x02";
Channel ID field is a 1-byte data field starting at byte offset 1;
Sequence number field is a 2-byte integer starting at byte offset 2;
Data field length field is a 2-byte data field starting at byte offset 4;
Family field is a 2-byte data field starting at byte offset 6; and
Subtype field is a 2-byte data field starting at byte offset 8.

An AIM log-on packet is a AIM packet with family field having a fixed hexadecimal value of "0x00 0x17" and subtype field having a fixed hexadecimal value of "0x00 0x06".

AIM log-on packet further includes buddy name length field, a 1-byte integer starting at byte offset 19, and a variable length buddy name field starting at byte offset 20. Buddy name length field indicates the length in bytes of buddy name field.

Security gateway 150 matches data packet 339 to determine if data packet 339 is an AIM log-on packet. In one embodiment, data packet 339 is an AIM log-on packet 400 illustrated in FIG. 4B. Security gateway 150 extracts buddy name length field 405. Security gateway 150 furthers extracts buddy name field 407. In this embodiment, buddy name length field 405 is integer "13" and buddy name field 407 is "JohnSmith1984". Security gateway 150 stores "JohnSmith1984" as public user identity 127 in application session record 184.

In one embodiment, data packet 339 is not an AIM log-on packet. Security gateway 150 inspects another data packet from host 130.

FIG. 5 illustrates a process to determine a private user identity.

Secure network 160 includes an identity server 570. The identity server 570 is operationally coupled to a processor 581 and a computer readable medium 582. The computer readable medium 582 stores computer readable program code for implementing the various embodiments of the present invention as described herein. Identity server 570 includes access session record 164 of access session 162 during which user 120 accesses application session 182.

Security gateway 150 queries identity server 570. Security gateway 150 sends host identity 134 and application session time 186 to identity server 570.

Identity server 570 receives host identity 134 and application session time 186. Identity server 570 matches host identity 134 and application session time 186 against access session record 164. Identity server 570 determines that host identity 134 matches host identity of access session record 164. Identity server 570 further determines that application session time 186 matches access session time 166 of access session record 164 as application session time 186 is between the starting time and the ending time of access session record 164. Identity server 570 sends private user identity 124 of access session record 164 to security gateway 150 as a response to the query.

Security gateway 150 receives private user identity 124 from identity server 570, and stores private user identity 124 in application session record 184.

In one embodiment, security gateway 150 stores public user identity 127 in application session record 184 after recognizing a log-on approval indication for the public user identity 127 from public application 180.

In one embodiment, security gateway 150 queries identity server 570 immediately after determining public user identity 127. In one embodiment, security gateway 150 queries identity server 570 after application session 182 ends.

In one embodiment, security gateway 150 queries identity server 570 by sending a plurality of host identities in a bulk request; and receives a plurality of private user identities in a bulk response.

In one embodiment, application session record 184 includes additional user information associated with private user identity 124, such as cubicle or office number, cubicle or office location, telephone number, email address, mail-drop location, department name/identity, or manager name.

In one embodiment, security gateway 150 obtains the additional user information from identity server 570. In one embodiment, security gateway 150 obtains the additional user information by querying a different server, such as a corporate directory server, by using the private user identity 124 received from identity server 570.

In one embodiment, public application 180 provides file transfer service using File Transfer Protocol (FTP) protocol or a proprietary protocol. In one embodiment, public application 180 provides email service using Simple Mail Transfer Protocol (SMTP), Internet Message Access Protocol (IMAP) or Post Office Protocol version 3 (POP3) protocol.

Figure 6:
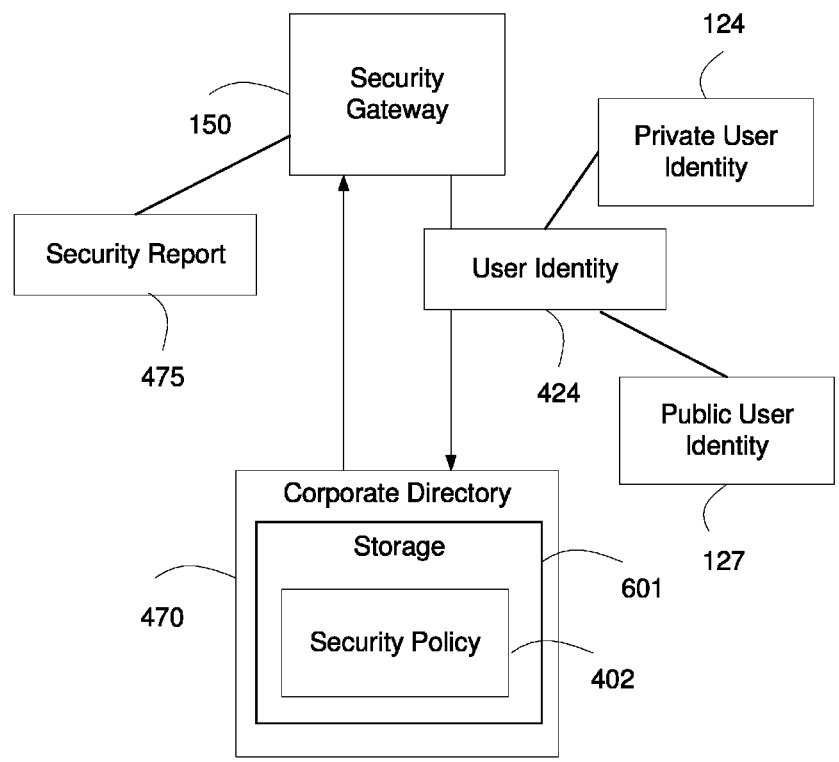
FIG. 6 illustrates an embodiment of a security gateway obtaining a security policy by querying a corporate directory.

By using the application session record, the private user identity 124 and the public user identity 127 for an application session 182 may be determined. In one embodiment as illustrated by FIG. 6, upon determining the public user identity and the private user identity, security gateway 150 obtains security policy 402 for the application session 182 by querying corporate directory 470. In an embodiment, corporate directory 470 comprises security policy 402. In one embodiment, corporate directory 470 is a server computer comprising a storage 601 that includes security policy 402. In one embodiment, corporate directory 470 is a database comprising security policy 402. In another embodiment, corporate directory 470 is a software module with program code stored on a computer readable medium (not shown) running in a computer. In one embodiment, corporate directory 470 resides in identity server 570. In one embodiment, corporate directory 470 uses directory technologies such as Microsoft Active Directory™, lightweight directory access protocol (LDAP) directory services, web services, directory services using Java™ technologies. In one embodiment, corporate directory 470 includes a policy server hosting security policy 402 and other policies. Security policy 402 may comprise a forwarding policy.

Security gateway 150 queries corporate directory 470 for a security policy, where the query includes user identity 424. User identity 424 may include private user identity 124 or public user identity 127. Corporate directory 470 matches user identity 424 against security policy 402 and determines security policy 402 is applicable to user identity 424. In one embodiment security policy 402 maps network parameters to a user identity and there is a match between user identity 424 and the user identity in the security policy 402. In one embodiment, security policy 402 maps network parameters to a group identity (not shown) and user identity 424 is a member of the group identity. In response to finding the match between the user identity 424 and the user identity in the security policy 402, corporate directory 470 sends security policy 402 to security gateway 150. In some embodiments, the response may also be referred to as a returned policy.

In one embodiment, security gateway 150 generates security report 475 based on application session record 184 and security policy 402. In one embodiment, security gateway 150 generates security report 475 based on a pre-determined user identity or a list of pre-determined user identities. For example, the security report may be generated based on an input of user identity or identities. In one embodiment, security gateway 150 generates security report 475 based on a pre-defined schedule or when requested by an operator.

Figure 7:
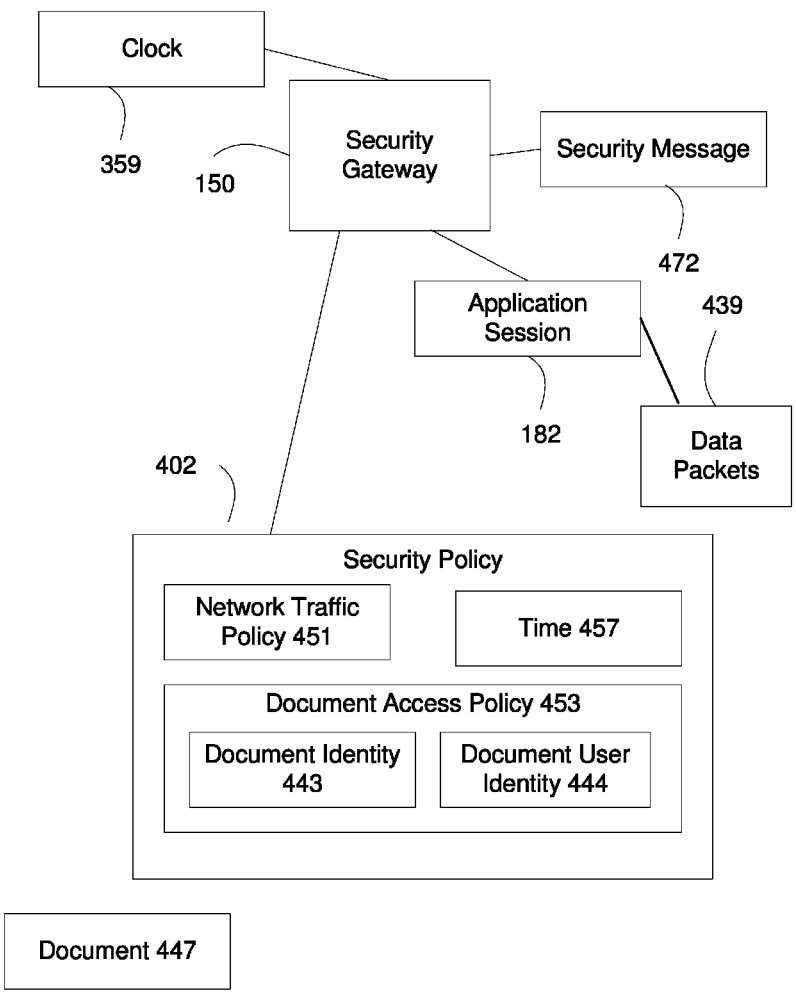
FIG. 7 illustrates a security policy including a security control.

In one embodiment, security policy 402 includes a security control function as illustrated in FIG. 7. Security gateway 150 applies the security policy 402 received from corporate directory 470 in response to the query to application session 182. Security policy 402 typically are configured by a company to protect against improper access to the company confidential documents and to protect against improper usage of the company secure network 160 vital for the company operation. In one embodiment, in response to receiving the security policy 402, the security gateway 150 confirms that the received security policy 402 contains a user identity that matches the user identity 424 sent in the query. In response to the confirmation, the security gateway 150 applies the security policy 402 to the application session 182. In FIG. 7, security policy 402 includes network traffic policy 451 or document access policy 453.

FIG. 8 illustrates a plurality of embodiments of network traffic policy 451. In one embodiment, network traffic policy 451 specifies network based application session access control indicating if user identity 424 is denied or allowed to continue application session 182. If denied, security gateway 150 may stop forwarding data packets 439 of application session 182. In one embodiment, network traffic policy 451 specifies bandwidth rate capacity such as 1 Mbps, 100 MB per day, or 5 GB per month. In an embodiment, bandwidth rate capacity is measured in packets such as 100 packets per second, 10 thousand packets per day or 4 million packets per month. In one embodiment, network traffic policy 451 specifies a quality of service (QOS) mapped to user identity 424 for application session 182. For example, network traffic policy 451 indicates a change of Differentiated Services Code Point (DSCP) marking in the data packets 439 of application session 182. In one embodiment, network traffic policy 451 specifies a queuing delay, a queuing priority, a packet forwarding path, a link interface preference, a server load balancing preference, a packet routing policy, or other control to handle data packets 439 of application session 182.

In one embodiment, network traffic policy 451 includes a traffic shaping control. In one example, traffic shaping control specifies a TCP profile such as a change of window segment size, or a TCP window adjustment.

In one embodiment, network traffic policy 451 indicates session connection rate control based on user identity 424 specifying a rate or capacity such as 10 session connections per second, 35 concurrent sessions, 100 sessions during lunch hour, 500 sessions a day, 24 voice sessions a day, or 75 file transfer sessions an hour. In one embodiment, network traffic policy 451 may specify, when exceeding the rate or capacity, if application session 182 is denied or data packets 439 of application session 182 are dropped.

In one embodiment, network traffic policy 451 includes application session modification control mapped to user identity 424, specifying how data packets 439 of application session 182 are modified for the user with the user identity 424. In one example, application session modification control specifies security gateway 150 should perform network address translation (NAT) to application session 182 for user identity 424. In one example, security gateway 150 should perform port address translation (PAT) to application session 182 using a pre-determined port number for user identity 424. In another example, security gateway 150 should perform content substitution if application session 182 is a HTTP session and if a Universal Resource Locator (URL) in data packets 439 of application session 182 matches a pre-determined URL for user identity 424. In an example, security gateway 150 should perform filename substitution if application session 182 is a file transfer session and if a filename matching a pre-determined filename is found in data packets 439 of application session 182 for user identity 424. In another example, security gateway 150 should insert a cookie for user identity 424 if application session 182 is an HTTP session, with optionally data packets 439 matching a pre-determined POST or GET request of a URL.

Returning to FIG. 7, in one embodiment, document access policy 453 specifies if access to document 447 is allowed or denied. In one embodiment, document 447 includes a file, a business agreement, a contract, a spreadsheet, a presentation, a drawing, a textual document, a manual, a program, a piece of software program, a design, a product specification, a datasheet, a video file, an audio file, an email, a voice mail, a fax, a photocopy of a document, or any business document. In one embodiment, document 447 includes an URL leading to digital information such as database query result, a web page, a video, or a piece of music. In one embodiment, document 447 includes real time transfer or streaming of information such as video streaming, audio streaming, a webcast, a podcast, a video show, a teleconference session, or a phone call. In one embodiment, document access policy 453 includes document identity 443 and document user identity 444. Document identity 443 identifies document 447. Document user identity 444 identifies the user whose access to the document 447 is affected by the document access policy 453. In an embodiment, security gateway 150 compares user identity 424 with document user identity 444. In response to determining that the user identity 424 matches the document user identity 444, in one embodiment, security gateway 150 allows document 447 with document identity 443 to be accessed by user identity 424. In another embodiment, security gateway 150 denies access to document 447 with document identity 443. In denying access, the security gateway 150 may disconnect application session 182 or discard data packets 439. In one embodiment, security gateway 150 confirms that data packets 439 include document identity 443. In response to confirming that data packets 439 include document identity 443, security gateway 150 applies document access policy 453.

In one embodiment security policy 402 includes time 457 where security policy 402 is applicable within time 457. In one embodiment, time 457 indicates a beginning time such as 8 am, 4 pm, or midnight. In an embodiment, time 457 indicates a time range such as 8 am to 10 am, 7 pm to 5 am, morning hours, lunch, rush hour, prime time. Security gateway 150 compares clock 359 with time 457 and determines if security policy 402 is applicable.

In one embodiment, security gateway 150 generates security message 472 when security gateway 150 determines if security policy 402 is applicable to application session 182 for user identity 424. In one embodiment, security gateway generates security message 472 when security gateway 150 applies security policy 402 to application session 182. In one embodiment, security report 475 includes security message 472. In one example, security message 472 includes security policy 402 and user identity 424. In one example, security message 472 includes the actions security gateway 150 applies to application session 182 using security policy 402.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for applying a forwarding policy by a network gateway comprising:
recognizing an application session between a first host having a first host identity and an application server;
determining an application identifier, application session time, and first user identity associated with the application session;
querying an identity server by providing the first host identity and the application session time;
receiving, from the identity server, a second user identity from an access session record in response to the query, wherein the receiving comprises:
determining a correlation between the first host identity and a second host identity associated with a second host in the access session record; and
determining a correlation between the application session time and an access session time in the access session record;

associating the second user identity with the first user identity;

receiving a forwarding policy based on the second user identity or the first user identity; and applying the forwarding policy to the application session.

2. The method of claim 1 further comprising storing the forwarding policy.

3. The method of claim 1 wherein the forwarding policy comprises forwarding information comprising at least one of a forwarding path, a link interface preference, a server load balancing preference, and a routing policy; and the applying the forwarding policy to the application session is based on the forwarding information.

4. The method of claim 1 wherein the forwarding policy comprises a network traffic processing information comprising at least one of bandwidth management, rate control, queuing delay, quality of service, and Differentiated Services Code Point (DSCP) marking; and the applying the forwarding policy to the application session is based on the network traffic processing information.

5. The method of claim 1 wherein the forwarding policy comprises a security information comprising at least one of access control, packet monitoring, file and document transfer monitoring, and application user identity monitoring; and the applying the forwarding policy to the application session is based on the security information.

6. The method of claim 1 comprising:

retrieving an application data field from the application session; and creating an application session record for the application session including the application data field.

7. The method of claim 6 wherein the application data field comprises at least one of a file name, document information, a URL, a user name, an email, a voice mail, and an identity.

8. The method of claim 1, wherein the network gateway comprises the identity server.

9. A system for applying a forwarding policy by a network gateway comprising:

a network gateway that:

recognizes an application session between a first host having a first host identity and an application server;

determines an application identifier, application session time, and first user identity associated with the application session;

queries an identity server by providing the first host identity and the application session time;

receives, from the identity server, a second user identity from an access session record in response to the query, wherein the identity server further:

determines a correlation between the first host identity and a second host identity associated with a second host in the access session record; and determines a correlation between the application session time and an access session time in the access session record;

associates the second user identity with the first user identity;

receives a forwarding policy based on the second user identity or the first user identity; and applies the forwarding policy to the application session.

10. The system of claim 9 wherein the network gateway further stores the forwarding policy.

11. The system of claim 9 wherein the forwarding policy comprises a forwarding information comprising at least one of a forwarding path, a link interface preference, a server load balancing preference, and a routing policy; and the network gateway applies the forwarding policy to the application session based on the forwarding information.

12. The system of claim 9 wherein the forwarding policy comprises a network traffic processing information comprising at least one of bandwidth management, rate control, queuing delay, quality of service, and Differentiated Services Code Point (DSCP) marking; and the network gateway applies the forwarding policy to the application session based on the network traffic processing information.

13. The system of claim 9 wherein the forwarding policy comprises a security information comprising at least one of access control, packet monitoring, file and document transfer monitoring, and application user identity monitoring; and the network gateway applies the forwarding policy to the application session based on the security information.

14. The system of claim 11 wherein the network gateway further:

retrieves an application data field from the application session; and creates an application session record for the application session including the application data field.

15. The system of claim 14 wherein the application data field comprises at least one of a file name, document information, a URL, a user name, an email, a voice mail, and an identity.

16. The system of claim 9 wherein the network gateway comprises the identity server.

17. A non-transitory computer-readable medium having instructions stored thereon, the instructions being executable by at least one processor to perform a method, the method comprising:

recognizing an application session between a first host having a first host identity and an application server;

determining an application identifier, application session time, and first user identity associated with the application session;

querying an identity server by providing the first host identity and the application session time;

receiving, from the identity server, a second user identity from an access session record in response to the query, wherein the receiving comprises:

determining a correlation between the first host identity and a second host identity associated with a second host in the access session record; and determining a correlation between the application session time and an access session time in the access session record;

associating the second user identity with the first user identity;

receiving a forwarding policy based on the second user identity or the first user identity; and applying the forwarding policy to the application session.

18. The non-transitory computer-readable medium of claim 17 wherein the method further comprises storing the forwarding policy.

19. The non-transitory computer-readable medium of claim 17 wherein the forwarding policy comprises forwarding information comprising at least one of a forwarding path, a link interface preference, a server load balancing preference, and a routing policy; and the applying the forwarding policy to the application session is based on the forwarding information.

20. The non-transitory computer-readable medium of claim 17 wherein the forwarding policy comprises a network traffic processing information comprising at least one of bandwidth management, rate control, queuing delay, quality of service, and Differentiated Services Code Point (DSCP)

marking; and the applying the forwarding policy to the application session is based on the network traffic processing information.

21. The non-transitory computer-readable medium of claim 17 wherein the forwarding policy comprises a security information comprising at least one of access control, packet monitoring, file and document transfer monitoring, and application user identity monitoring; and the applying the forwarding policy to the application session is based on the security information.

22. The non-transitory computer-readable medium of claim 17 wherein the method further comprises:
   retrieving an application data field from the application session; and
   creating an application session record for the application session including the application data field.

* * * * *